Figure 1:
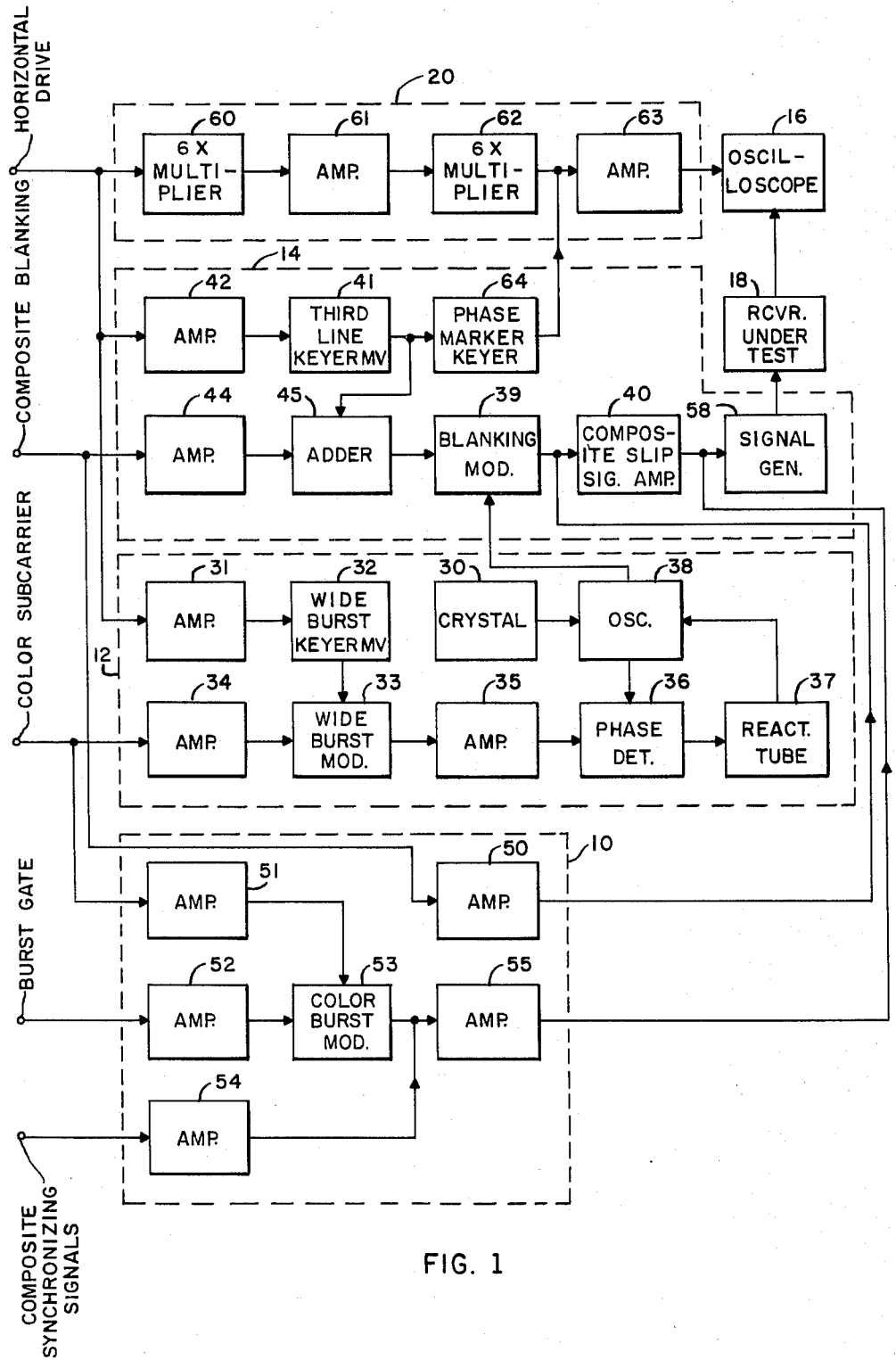

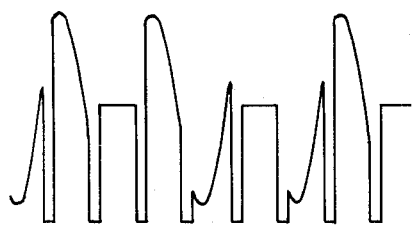
FIG. 2
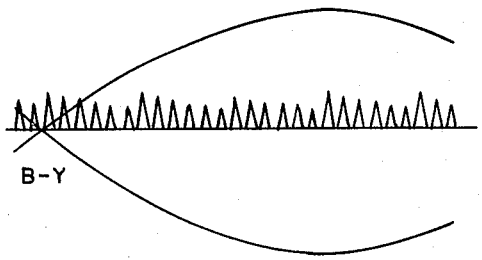
B-Y
FIG. 5
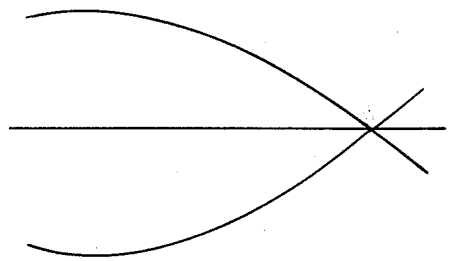
FIG. 3
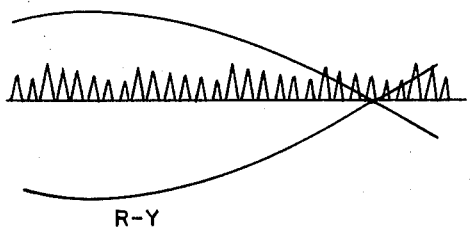
R-Y
FIG. 6
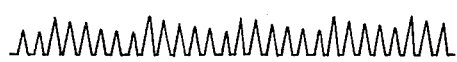
FIG. 4
G-Y
FIG. 7
B-Y    FIG. 8a
R-Y    FIG. 8b
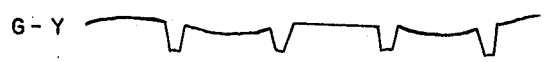
G-Y    FIG. 8c

United States Patent Office 3,250,853
Patented May 10, 1966

3,250,853
COLOR-TELEVISION TEST SIGNAL GENERATOR
Bernard D. Loughlin, Huntington, N.Y., assignor to Hazeltine Research Inc., a corporation of Illinois
Filed Sept. 24, 1962, Ser. No. 225,478
3 Claims. (Cl. 178—5.4)

This invention is directed to apparatus for generating signals especially useful in testing the performance of color-television receivers.

Complete performance tests of a color-television receiver have required several man weeks of testing time when using conventional test methods. Substantial time savings can be made by using a test signal generator in accordance with the present invention to measure a number of the more important characteristics of a color-television receiver.

The present test signal generator, when associated with a color-television receiver, produces output signals whose waveforms, when observed on an oscilloscope, provide direct and accurate measurements of certain receiver characteristics. These waveforms can be photographed with an oscilloscope camera and the desired test information can be taken directly from the waveform photographs. The special features of the equipment permit rapid measurement of:

(1) Color difference demodulation gains;
(2) Color difference demodulation phase angles;
(3) Hue control range;
(4) Envelope detection in demodulators, and
(5) Luminance suppression (chrominance signal rectification effects).

Other measurements such as color killer action, minimum burst required for synchronization and 920 kc. beat-note can also be made with the equipment.

Prior test equipment and methods have tended to be either accurate and time consuming, or rapid but of limited accuracy. An example of the latter is described at pages 23 to 26 of the July 1955 issue of the Institute of Radio Engineers Transactions on Broadcast and Television Receivers.

It is therefore an object of the invention, to provide new and improved apparatus for use in testing the performance of color-television receivers, which permits testing rapidly and accurately.

In accordance with the invention, apparatus for use in testing the performance of color-television receivers comprises first means for supplying first signals including horizontal synchronizing pulses and color bursts for synchronizing the color oscillator of a receiver to be tested at the proper color subcarrier frequency. The apparatus also includes second means for supplying a continuous wave signal of frequency differing from the color subcarrier frequency by an odd multiple of one-half of the horizontal synchronizing pulse repetition rate and third means for combining the first signals and the continuous wave signal to form a composite signal suitable for coupling into the receiver to be tested. In the composite signal thus formed, the continuous wave signal simulates chrominance information during periods between predetermined horizontal synchronizing pulses, whereby the composite signal will cause a beat-note signal to be developed in each color information channel of a receiver under test and the desired performance information can be derived from such beat-note signals.

For a better understanding of the present invention, together with other and further objects thereof, reference is had to the following description taken in connection with the accompanying drawings, and its scope will be pointed out in the appended claims.

Referring to the drawings:

FIG. 1 illustrates a test signal generator in accordance with the invention, and
FIGS. 2 through 8 represent waveforms useful in describing the operation and use of the FIG. 1 apparatus.

*Apparatus of FIG. 1*

Referring now to FIG. 1, there is shown apparatus for use in testing the performance of a color-television receiver, in accordance with the invention. As illustrated in FIG. 1, the apparatus includes first means 10 for supplying a first signal which may include luminance information corresponding to a constant grey field and also includes horizontal synchronizing pulses and color bursts for synchronizing the color oscillator of a receiver which is to be tested at the proper color subcarrier frequency for such receiver. As thus described, these signals can be considered to include all the information of a complete color-television signal of the NTSC type but lacking any chrominance information. The nature of such a signal is well known.

The apparatus also includes second means 12 for supplying a continuous wave (C.-W.) signal of frequency differing from the color burst frequency by an odd multiple of one-half of the horizontal synchronizing pulse repetition rate. Second means 12, as illustrated in FIG. 1, supplies a C.-W. signal of frequency equal to the color burst frequency plus one-half of the horizontal synchronizing pulse repetition rate.

The apparatus further includes third means 14 for combining said first signals and said C.-W. signal and forming a composite signal having the C.-W. signal incorporated as simulated chrominance information during periods between predetermined horizontal synchronizing pulses.

There is also shown in FIG. 1 display means 16 for monitoring color information signals developed by a receiver under test, as well as a color-television receiver 18 illustrated in position for testing. Receiver 18 does not form a part of the apparatus in accordance with the invention. Furthermore, display means 16, shown as an oscilloscope which is preferably a dual-trace oscilloscope, is not to be considered as an essential element within the scope of the broad aspect of the present invention, although it does represent a preferred form of an element for reading out the performance characteristics of the receiver 18 when signals are supplied thereto from units 10, 12, and 14.

In accordance with a further aspect of the present invention there is provided means 20 for supplying phase markers to the display means 16. As shown, means 20 is constructed to provide phase markers at 5 and 30 degree intervals by successive multiplications of the horizontal synchronizing pulse repetition frequency.

*Operation*

The operation of the FIG. 1 apparatus will now be considered. When the input signal to the demodulators of a color-television receiver differs from the reference subcarrier frequency (color subcarrier), beat-frequency outputs are produced whose amplitudes are proportional to the relative demodulator gains. If a constant frequency difference is maintained between the demodulator input signal and the reference oscillator, relative demodulation phase angles may be obtained directly from the relative phase angles of the beat-note signals. Such a signal, with a constant frequency difference, will be called a "slip signal" and test signal generators constructed in accordance with the invention use this technique. The signal may be thought of as a chrominance signal with its phase linearly advancing 180 degrees during each horizontal line interval. The constant phase change of the signal with respect to the reference subcarrier frequency has given rise to the name slip signal. In the apparatus of FIG. 1, this slip signal has a frequency equal to the color subcarrier frequency plus one-half of the horizontal line frequency. This frequency relation was chosen so that one-half cycle of beat-note signal is produced during each horizontal line interval. An oscilloscope may then be adjusted so as to superimpose the signals produced during several horizontal line intervals. So adjusted, the oscilloscope will display a sharp crossover of alternate half-cycles of the beat-note signal. Using these superimposed half-cycles, accurate measurement can be made of the variables listed above. The method of making these measurements will be described below.

A composite signal which will be called the composite slip signal is actually used in color-television receiver testing. The composite slip signal includes horizontal synchronizing pulses, color bursts and a luminance signal consisting of a flat grey field, which are combined with the slip signal. The composite slip signal is used to modulate a picture modulated signal generator, the output of which is applied to the antenna input of a color-television receiver, properly adjusted for color reception. The slip signal, like any chrominance signal, after being detected in the receiver's video detector is coupled to the chrominance demodulators, and each of the chrominance, or color difference outputs, $R-Y$, $B-Y$ and $G-Y$, is sine wave interrupted by blanking and a third line keyout interval, the purpose of which is described later.

FIG. 2 shows a typical color difference signal output of a color-television receiver on an oscilloscope synchronized with a horizontal drive signal and adjusted for a sweep frequency of one-twelfth of the horizontal line frequency. The pulse illustrated during the blanking interval is inserted by a typical color-television receiver. FIG. 2 shows the character of the signal as it is produced with the simplets oscilloscope display. The receiver output signal is most useful, however, if the oscilloscope sweep frequency is changed to one-fifth of the horizontal line frequency. This sweep rate will superimpose horizontal line intervals so as to produce "crossovers" of alternate half cycles of the beat-note signal and with sweep magnification the display will appear as shown in FIG. 3. The FIG. 3 form of display is satisfactory for demodulator amplitude and phase measurements and other measurements.

A slip signal frequency may be chosen above or below the reference subcarrier frequency. The frequency is preferably selected, however, to produce a comparatively low beat-frequency which is at an odd multiple of half line frequency. This choice simplifies oscilloscope synchronization and the generation of phase markers. Also, other keyout frequencies can be utilized instead of the third line keyout arrangement previously mentioned.

The operation of the slip generator may be understood by referring to FIG. 1. The signal inputs required for operation of the slip generator are (1) horizontal drive, (2) composite synchronizing signals, (3) composite blanking, (4) burst gate and (5) color subcarrier (3.579545 mc. for NTSC operation) signal. The nature and fabrication of such signals are well known to workers in the field of color television and the major requisites of such signals have been defined by the Federal Communications Commission for the NTSC system in use in the United States.

In the generator of FIG. 1, the basic signal source is a 3.587412 mc. crystal 30. The crystal 30 is phase locked with the 3.579545 mc. color subcarrier signal to produce the constant slip frequency desired. The phase locking of the crystal 30 to the reference 3.579545 mc. is achieved by making comparisons only for short time durations and at intervals which occur at half line frequency. Horizontal drive signals are coupled, via amplifier 31, to a wide burst keyer multivibrator 32 and wide burst modulator 33 (which also receives color subcarrier signals via amplifier 34) which supply the desired synchronization, via amplifier 35, to a conventional circuit including phase detector 36, reactance tube 37 and oscillator 38. The oscillator 38 stably sidelocks at the desired sideband of the color subcarrier with this arrangement.

The output of oscillator 38 is fed to a blanking modulator 39 which inserts the composite blanking signal and also blanks out every third line so as to establish a baseline which is used for reference purposes as will be described below. Blanking of every third line is accomplished by third line keyer multivibrator 41 which receives horizontal drive signals from amplifier 42. The output of multivibrator 41 is combined with amplified composite blanking signals out of amplifier 44, with the aid of adder 45 and supplied to modulator 39.

Amplifier 50 supplies composite blanking signals including components simulating a constant grey luminance signal. The output of amplifier 50 is combined with the output of blanking modulator 39 and the resulting signal is amplified in amplifier 40 and added to the composite synchronizing signals and regular color burst output from amplifier 55. The color burst is obtained by modulating the reference subcarrier (available at the output of amplifier 51) with a burst gate pulse (available at the output of amplifier 52) in color burst modulator 53. Composite synchronizing signals are amplified in amplifier 54, combined with the color burst at the output of modulator 53, and the resulting signals appear at the output of amplifier 55 for combining with signals out of amplifier 40. The composite slip signal out of amplifier 40 is used to modulate the output of signal generator 58 to produce a signal suitable for application to the antenna input terminals of a color-television receiver under test.

The phase markers are generated in means 20 which includes circuits which successively multiply the horizontal line frequency by six and six to derive 36 marker pulses per horizontal line period. Thus, means 20 includes multiplier 60, amplifier 61, multiplier 62 and output amplifier 63. Output amplifier 63 is controlled by phase marker keyer 64 which is effective to cause the phase markers out of amplifier 63 to be present only during the blanked third line reference interval.

The slip signal rotates through 180 degrees during one horizontal line period, therefore, with 36 marker pulses per horizontal line period the phase markers are spaced five degrees apart. The peaks of the phase markers have an approximately sawtooth envelope for every six markers due to decrement of the circuits involved in and after the second six times multiplication. The nature of this envelope readily shows 30 degree intervals. Phase markers are keyed in on one of the two traces of the dual channel scope 16 during the third horizontal line period when the slip signal is absent, in order to present the markers in the most usable form with minimum disturbance to other useful portions of the slip output signal.

Individual controls are provided for the adjustment of the composite synchronizing signal, the color burst, the luminance or grey field portion of the signal and the slip signal. These controls may take the form of adjustable gain controls for the appropriate amplifiers involved. Also, a slip signal phase control is provided to permit adjustment of the phase of the beat-note signals as viewed on the oscilloscope. This control can be provided in a well known manner as a portion of the circuitry of phase detector 36.

*Measurement techniques*

Measurement techniques and measurement conditions for an NTSC receiver will now be described, and will serve to bring out more clearly the operation and functioning of the FIG. 1 apparatus.

*Phase measurements.*—The relative phase of the beat-note output of the three color difference channels of a receiver are a measure of decoding accuracy. Thus, if the $B-Y$ output sine wave is considered to have a phase angle of zero degrees, then, if the receiver is decoding accurately, the $R-Y$ output sine wave will have a phase angle of 90 degrees and the $G-Y$ output sine wave will have a phase angle of 237 degrees.

The method of measurement of the relative phase angles is as follows. If the oscilloscope display of any one of the three color difference outputs is adjusted so that the oscilloscope sweep frequency corresponds to any odd submultiple of horizontal line frequency, a "crossover" will appear at the sine wave axis, thus sharply defining the time or phase for zero synchronous detection output. If the oscilloscope sweep frequency is made one-fifth the horizontal line drive frequency, the oscilloscope display will appear, as shown in FIG. 3, with the output signals for three horizontal line intervals superimposed, that is, both the "crossover" and the reference base will appear superimposed as if they had occurred simultaneously during one horizontal line interval. (The sweep is magnified to show only one horizontal line interval in FIG. 3.) This represents a typical waveform used for test.

The period of one horizontal line is equivalent to 180 degrees. Therefore, if appropriate phase markers are added to the display, the relative phases of the "crossover" at the $R-Y$ and $G-Y$ outputs can be measured with respect to the "crossover" at the $B-Y$ output. The phase control in the slip signal generator can be adjusted so that all three "crossovers" appear during the unblanked portion of one horizontal interval. The slip signal generator has a separate phase marker output and produces marker pulses every five degrees during one line interval, as shown in FIG. 4.

The $B-Y$, $R-Y$ and $G-Y$ outputs of a color-television receiver are shown in FIGS. 5, 6 and 7, with phase marker addition as described above. The oscilloscope was synchronized by horizontal drive with the sweep frequency at one-fifth horizontal line frequency, and the sweep was magnified to show only one line interval. In the displays shown in FIGS. 5, 6 and 7, an ambiguity exists because identical displays will be shown when demodulation axes are 180 degrees apart. When necessary this ambiguity can be resolved easily by observing successively the $B-Y$, $G-Y$ and $R-Y$ chrominance outputs with the oscilloscope sweep at one-sixth horizontal line frequency, as shown in FIG. 8. If the slip signal generator phase control is adjusted so that the $B-Y$ positive peak occurs shortly after the blanking interval, as shown in FIG. 8a, then, if no phase reversal error has occurred, the $R-Y$ peak output will occur about one-half of a horizontal line interval later, as shown in FIG. 8b, and the $G-Y$ negative peak, as shown in FIG. 8c will occur between the $B-Y$ and $R-Y$ positive peaks.

*Receiver color difference signal amplitude measurements.*—The peak-to-peak beat-note outputs at the $B-Y$, $G-Y$ and $R-Y$ outputs can be measured on a calibrated oscilloscope using the waveforms shown in FIGS. 5, 6 and 7. In FIGS. 5, 6 and 7, as shown the peak-to-peak outputs for $B-Y$ and $R-Y$ can be measured directly but the peak-to-peak output for $G-Y$ occurs during blanking and the phase control on the slip signal generator would have to be adjusted to cause display of the $G-Y$ signal peak.

From the peak-to-peak color difference signals at the $R-Y$, $G-Y$ and $B-Y$ outputs the relative gains can be computed. With equal luminance drives to the red, green and blue guns of the picture tube the relative $R-Y$, $G-Y$ and $B-Y$ gains should be 1.14, 0.69, and 2.03 respectively. If the $R-Y$ gain is normalized at 1.00, then $B-Y$ and $G-Y$ gains should be 1.78 and 0.61 respectively.

Note that peak-to-peak amplitude measurements of the beat-note can be readily made with the displays of FIGS. 5, 6 and 7. This results from the unique frequency relation which provides a display with positive and negative peaks directly above each other.

*Envelope detection measurements.*—During the third line, when the slip signal is keyed out, there will be no output from the chrominance demodulators. During the other two lines, at the instant of "crossover," the slip signal is in quadrature with the chrominance signal demodulation axis and the synchronous detector output will be zero. If there is any output it will be caused by undesired envelope detection. The effect of envelope detection is to displace the "crossover" above or below the reference base. Envelope detection can be measured as a percentage, computed by dividing this displacement by the peak amplitude of the color difference signal.

*Luminance suppression measurement.*—Due to the fact that the chrominance signal is transmitted single sideband, the chrominance signal can cause suppression of the luminance signal in a television receiver. For a discussion of this phenomenon reference is made to "Color Distortions in Envelope Type Second Detectors" by Bernard D. Loughlin in the IRE Transactions on Broadcast and Television Receivers, October 1957. Luminance suppression can be observed at the luminance output of a receiver with the slip signal applied to the receiver input. During the two lines when the slip signal is keyed in, the luminance signal amplitude is less than the amplitude during the third line when the slip signal is keyed out. Luminance suppression can be measured as the percent reduction in luminance signal when the chrominance signal is present.

*Hue control range measurements.*—The hue control range can be measured at the time phase and amplitude measurements are made, at any color difference output. The phase control on the slip signal generator is adjusted to place the crossover on the 30 degree marker in the center of a horizontal line. The television receiver hue control is then alternatively varied between its extreme positions, each time measuring the phase shift of the crossover, to obtain maximum positive and negative phase shifts of the hue control.

It will now be appreciated that the present invention includes the realization that if slip signals of proper frequency are provided and resulting heat-note signals produced by a color-television receiver under test are viewed in superimposed relation, then the performance of such a receiver can be tested rapidly and with accuracy. One specific apparatus for generating the desired signals has been illustrated and described, however, it will be obvious to those skilled in the art that various changes and modifications may be made therein without departing from the invention, and it is therefore, aimed to cover all such changes and modifications as fall within the true spirit and scope of the invention.

What is claimed is:

1. Apparatus for use in testing the performance of color-television receivers comprising:

first means for supplying first signals including horizontal synchronizing pulses and color bursts for synchronizing the color oscillator of a receiver to be tested at the proper color subcarrier frequency;

second means for supplying a continuous wave signal of frequency differing from the color subcarrier frequency by an odd multiple of one-half of the horizontal synchronizing pulse repetition rate;

and third means for combining said first signals and said continuous wave signal and forming a composite signal suitable for coupling into the receiver to be tested, said composite signal having said continuous wave signal incorporated as simulated chrominance information during periods between predetermined horizontal synchronizing pulses;

whereby the composite signal will cause a beat-note signal to be developed in each color information channel of a receiver under test and performance information can be derived from such beat-note signals.

2. Apparatus for use in testing the performance of color-television receivers comprising:

first means for suppling first signals including luminance information corresponding to a constant grey field and horizontal synchronizing pulses and color bursts for synchronizing the color oscillator of a receiver to be tested at the proper color subcarrier frequency;

second means for supplying a continuous wave signal of frequency differing from the color subcarrier frequency by an odd multiple of one-half of the horizontal synchronizing pulse repetition rate;

and third means for combining said first signals and said continuous wave signal and forming a composite signal suitable for coupling into the receiver to be tested, said composite signal having said continuous wave signal incorporated as simulated chrominance information during periods between predetermined horizontal synchronizing pulses;

whereby the composite signal will cause a beat-note signal to be developed in each color information channel of a receiver under test and relative gain, phase of decoding and any rectification effects of the color channels as well as phase variations of the receiver's color oscillator can be measured using the beat-note signals.

3. Apparatus for use in testing the performance of color-television receivers comprising:

first means for supplying first signals including luminance information corresponding to a constant grey field and horizontal synchronizing pulses and color bursts for synchronizing the color oscillator of a receiver to be tested at the proper color subcarrier frequency;

second means for supplying a continuous wave signal of frequency differing from the color subcarrier frequency by one-half of the horizontal synchronizing pulse repetition rate;

third means for combining said first signals and said continuous wave signal and forming a composite signal suitable for coupling into the receiver to be tested, said composite signal having said continuous wave signal incorporated as simulated chrominance information during periods between predetermined horizontal synchronizing pulses;

display means for monitoring color information signals developed by a receiver under test;

and means for supplying phase markers to said display means;

whereby the composite signal will cause a beat-note signal to be developed in each color information channel of a receiver under test and relative gain, phase of decoding and any rectification effects of the color channels as well as phase variations of the receiver's color oscillator can be measured from such beat-note signals as displayed by the display device.

References Cited by the Examiner

Publication: "Understand Your Color Bar Generator," Radio Electronics, June 1956, pages 52–55.

Publication: "Test Equipment for Color," Radio and Television News, August 1956, pages 63–65.

Publication: "Use of the Vectorscope Technique To Service Color TV," Electronic Technician, August 1957, pages 34–37.

Publication: "Instructions for Philco Universal Color Bar and Dot Generator," Service Manual of Philco Corp., received Sept. 3, 1957, pages 3, 6–8.

DAVID G. REDINBAUGH, *Primary Examiner.*

J. A. O'BRIEN, *Assistant Examiner.*